US010678467B2

(12) United States Patent
Sankaranarayanan et al.

(10) Patent No.: US 10,678,467 B2
(45) Date of Patent: Jun. 9, 2020

(54) SYSTEMS AND METHODS FOR SELECTIVE SAVE OPERATIONS IN A PERSISTENT MEMORY

(71) Applicant: Dell Products L.P., Round Rock, TX (US)

(72) Inventors: Vadhiraj Sankaranarayanan, Austin, TX (US); Krishna Pradyumna Kakarla, Round Rock, TX (US); Balaji Bapu Gururaja Rao, Austin, TX (US); Elie Antoun Jreij, Pflugerville, TX (US)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 15/727,173

(22) Filed: Oct. 6, 2017

(65) Prior Publication Data

US 2019/0107950 A1   Apr. 11, 2019

(51) Int. Cl.
G06F 3/06 (2006.01)
G06F 12/02 (2006.01)
G06F 12/10 (2016.01)

(52) U.S. Cl.
CPC .......... *G06F 3/065* (2013.01); *G06F 3/0619* (2013.01); *G06F 3/0647* (2013.01); *G06F 3/0685* (2013.01); *G06F 12/02* (2013.01); *G06F 3/0631* (2013.01); *G06F 12/10* (2013.01); *G06F 2212/65* (2013.01); *G06F 2212/7203* (2013.01); *G06F 2212/7208* (2013.01)

(58) Field of Classification Search
CPC .... G06F 3/0619; G06F 3/0631; G06F 3/0647; G06F 3/0685; G06F 12/10; G06F 2212/65; G06F 3/065; G06F 12/02
See application file for complete search history.

(56) References Cited

U.S. PATENT DOCUMENTS

| 2010/0008175 | A1* | 1/2010 | Sweere | G06F 12/0866 365/229 |
| 2010/0202240 | A1* | 8/2010 | Moshayedi | G11C 5/04 711/103 |
| 2013/0054871 | A1* | 2/2013 | Lassa | G06F 3/061 711/103 |
| 2018/0067666 | A1* | 3/2018 | d'Abreu | G06F 3/0619 |

* cited by examiner

*Primary Examiner* — Masud K Khan
(74) *Attorney, Agent, or Firm* — Jackson Walker L.L.P.

(57) ABSTRACT

In accordance with embodiments of the present disclosure, an information handling system may include a processor and a persistent memory system communicatively coupled to the processor, the persistent memory system comprising one or more persistent memory modules and a plurality of targeted save registers, each targeted save register associated with a respective portion of the persistent memory system, and each targeted save register having a value indicative of how save operations from volatile memory to non-volatile memory of the persistent memory system are to be performed with respect to the respective portion of the persistent memory system.

12 Claims, 1 Drawing Sheet

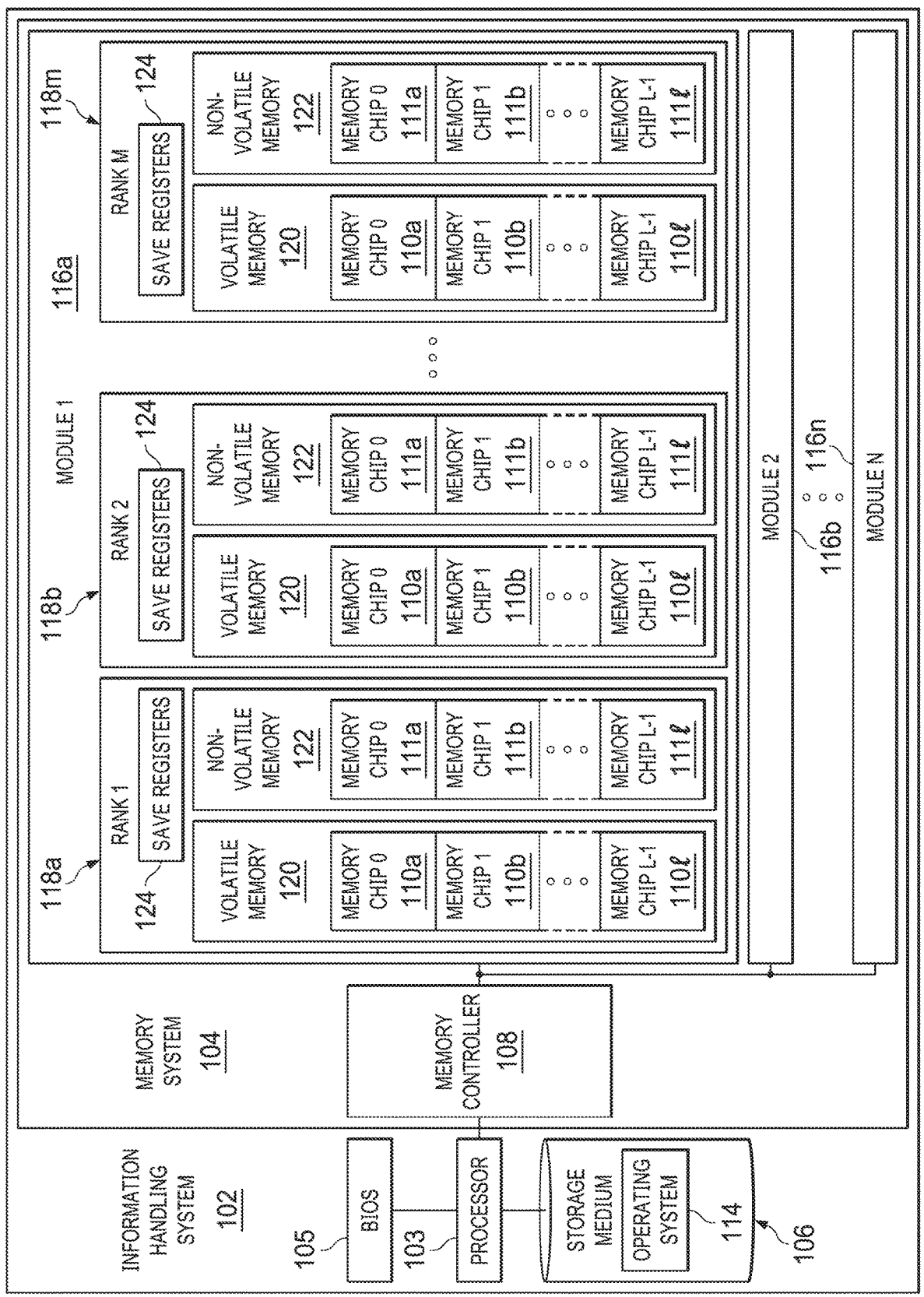

US 10,678,467 B2

SYSTEMS AND METHODS FOR SELECTIVE SAVE OPERATIONS IN A PERSISTENT MEMORY

TECHNICAL FIELD

The present disclosure relates in general to information handling systems, and more particularly to systems and methods for carrying out selective save operations in a persistent memory.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are increasingly using persistent memory technologies such as Non-Volatile Dual In-line Memory Modules (NVDIMMs). An NVDIMM is a memory module that may retain data even when electrical power is removed either from an unexpected power loss, system crash or from a normal system shutdown. One implementation of NVDIMM that is often preferred is that of NVDIMM-N. An NVDIMM-N may include a traditional dynamic random access memory (DRAM) which may store data during normal operation when electrical power is available from a power supply unit and a flash memory to back up data present in the DRAM when a loss of electrical power from the power supply unit occurs. A battery, capacitor, or other energy storage device either internal or external to the NVDIMM-N may supply electrical energy for a "save" operation to transfer data from the DRAM to the flash memory in response to a power loss event from the power supply unit. Accordingly, the NVDIMM-N may expose only its volatile memory to a host system, thus achieving DRAM-like latencies for memory operations while still providing for data persistence in the event of power loss through the save operation.

Existing NVDIMM-N memory specifications provide for a one-to-one mapping of volatile memory to non-volatile memory during save and restore operations, and in the event of a power loss, an entire volatile space of an NVDIMM-N is copied to non-volatile memory in save operation. Such approaches have many inefficiencies. For example, in some instances, such approaches result in wasted use of resources (e.g., processing resources, battery life of battery powering save operations) in performing save operations on data not requiring persistency. As another example, because save operations cause wear of non-volatile memory media, such backing up of unnecessary data may lead to reduced device life. Another drawback of existing approaches is that they treat all data in the persistent memory as having equal priority, when in fact some data may be more critical, requiring greater persistency.

SUMMARY

In accordance with the teachings of the present disclosure, the disadvantages and problems associated with save operations in a persistent memory of an information handling system may be reduced or eliminated.

In accordance with embodiments of the present disclosure, an information handling system may include a processor and a persistent memory system communicatively coupled to the processor, the persistent memory system comprising one or more persistent memory modules and a plurality of targeted save registers, each targeted save register associated with a respective portion of the persistent memory system, and each targeted save register having a value indicative of how save operations from volatile memory to non-volatile memory of the persistent memory system are to be performed with respect to the respective portion of the persistent memory system.

In accordance with these and other embodiments of the present disclosure, a method may include, in a persistent memory system communicatively comprising one or more persistent memory modules and a plurality of targeted save registers: storing a respective value in each of the plurality of targeted save registers and performing a save operation of the persistent memory system based on the respective values, wherein each respective value is indicative of how save operations from volatile memory to non-volatile memory of the persistent memory system are to be performed with respect to the portion of the persistent memory system associated with the targeted save registers. In accordance with these and other embodiments of the present disclosure, a persistent memory system may include one or more persistent memory modules and a plurality of targeted save registers, each targeted save register associated with a respective portion of the persistent memory system, and each targeted save register having a value indicative of how save operations from volatile memory to non-volatile memory of the memory system are to be performed with respect to the respective portion of the memory system.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawing, in which like reference numbers indicate like features, and wherein:

THE FIGURE illustrates a block diagram of an example information handling system in accordance with embodiments of the present disclosure.

DETAILED DESCRIPTION

Preferred embodiments and their advantages are best understood by reference to THE FIGURE, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

THE FIGURE illustrates a block diagram of an example information handling system 102 in accordance with certain embodiments of the present disclosure. In certain embodiments, information handling system 102 may comprise a computer chassis or enclosure (e.g., a server chassis holding one or more server blades). In other embodiments, information handling system 102 may be a personal computer (e.g., a desktop computer or a portable computer). As depicted in THE FIGURE, information handling system 102 may include a processor 103, a memory system 104 communicatively coupled to processor 103, a basic input/output system (BIOS) 105 communicatively coupled to processor 103, and a storage medium 106 communicatively coupled to processor 103.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored and/or communicated by one or more of memory system 104, BIOS 105, storage medium 106, and/or another component of information handling system 102.

Memory system 104 may be communicatively coupled to processor 103 and may comprise any system, device, or apparatus operable to retain program instructions or data for a period of time (e.g., computer-readable media). Memory system 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off. In particular embodiments, memory system 104 may comprise a persistent memory (e.g., comprising one or more NVDIMMs) that includes volatile memory (e.g., DRAM or other volatile random-access memory) and non-volatile memory (e.g., flash memory or other non-volatile memory), as described in greater detail below.

As shown in THE FIGURE, memory system 104 may include memory controller 108 and one or more memory modules 116a-116n communicatively coupled to memory controller 108. Memory controller 108 may be any system, device, or apparatus configured to manage and/or control memory system 104. For example, memory controller 108 may be configured to read data from and/or write data to memory modules 116 comprising memory system 104. Additionally or alternatively, memory controller 108 may be configured to refresh memory modules 116 and/or memory chips 110 thereof in embodiments in which memory system 104 (or a portion thereof) comprises DRAM. Although memory controller 108 is shown in THE FIGURE as an integral component of memory system 104, memory controller 108 may be separate from memory system 104 and/or may be an integral portion of another component of information handling system 102 (e.g., memory controller 108 may be integrated into processor 103).

Each memory module 116 may include any system, device or apparatus configured to retain program instructions and/or data for a period of time (e.g., computer-readable media). As shown in THE FIGURE, a memory module 116 may comprise a persistent memory (e.g., NVDIMM) comprising volatile memory 120 and non-volatile memory 122. As depicted in THE FIGURE, each memory module 116 may include one or more ranks 118a-118m. Each memory rank 118 within a memory module 116 may be a block or area of data created using some or all of the memory capacity of the memory module 116. In some embodiments, each rank 118 may be a rank as such term is defined by the JEDEC Standard for memory devices.

As shown in THE FIGURE, each rank 118 may include a volatile memory 120 and an associated non-volatile memory 122. Each rank-level volatile memory 120 may include a plurality of memory chips 110, and each rank-level non-volatile memory 122 may include a plurality of memory chips 111. Each memory chip 110 may include a packaged integrated circuit configured to comprise a plurality of volatile memory cells for storing data. In some embodiments, a memory chip 110 may include dynamic random access memory (DRAM). Each memory chip 111 may include a packaged integrated circuit configured to comprise a plurality of non-volatile memory cells for storing data. In some embodiments, a memory chip 111 may include flash memory.

During normal operation, when an electrical power source provides adequate power to components of information handling system 102, data written to memory 104 from processor 103 may be stored in volatile memory 120. However, in the event of loss of system input power or a power fault that prevents delivery of electrical energy from the power source to memory 104, data stored in volatile memory 120 may be transferred to non-volatile memory 122 in a save operation. After input power is restored, or a faulty power source is replaced, such that the power source is again operable to provide electrical energy to information handling resources of information handling system 102, on the subsequent power-on of information handling system 102, data may be copied from non-volatile memory 122 back to volatile memory 120 via a restore operation. The combined actions of data save and then data restore, allow the data to remain persistent through a power disruption. Accordingly, although not explicitly shown in THE FIGURE, memory 104 may also include hardware, firmware, and/or software for carrying out save operations.

As shown in THE FIGURE, each rank 118 may include one or more target save registers 124. Target save registers 124 may comprise volatile or non-volatile computer-readable media. Target save registers 124 may be configured to, for the rank 118 they are implemented within or associated with, set forth rank-level selective save information for the rank 118. For example, in some embodiments, each rank 118 may include a single-bit target save register 124 with a value indicating whether save operations will be performed for the memory media in such rank 118 responsive to a power event. In such embodiments, operating system (OS) 114 executing on processor 103 may, via memory controller 108 (or, alternatively, via memory controller 108 acting under the control of OS 114), set values of the various single-bit target save registers 124 such that desired data (e.g., data deemed by a user or OS 114 to be critical) may be backed up during a save operation while non-desired data is not backed up during the save operation. In addition or alternatively, OS 114 and/or memory controller 108 may configure single-bit target save registers 124 so as to carry out wear-leveling of the memory media within memory system 104 by periodically changing which ranks 118 are used for storage of data, enabling save operations on ranks 118 used for storage of data, and disabling save operations on ranks not used for storage of data. Additionally or alternatively, OS 114 and/or memory controller 108 may set such single-bit target save registers 124 based on capacity of a battery for powering save operations and/or health of memory media within a memory module 116, thus permitting provisioning and usage of persistent memory based on data criticality, battery capacity, and/or memory media health. Accordingly, resource use in performing a save operation (and a subsequent restore operation) may be minimized and device life may be extended, as compared with existing approaches.

In these and other embodiments, target save registers 124 may include other information for enabling redundancy in save operations. For example, in such embodiments, a target save register 124 on a first rank 118 may identify a second rank 118 to which data of first rank 118 may be duplicated during a save operation, such that responsive to a power event, data stored in volatile memory 120 of first rank 118 may be replicated in a save operation to both non-volatile memory 122 of first rank 118 and non-volatile memory 122 of second rank 118. In such embodiments, memory controller 108 and memory modules 116 may include structure and function necessary to carry out such duplicate save operations. Alternatively to such duplicate save operations, OS 114 and/or memory controller 108 may simply mirror critical data during runtime to volatile memory 120 of two or more different memory locations of memory system 104 (e.g., two different ranks 118), such that a save operation will lead to the critical data being backed up to non-volatile memory 122 of two or more different memory locations, thus improving data reliability, availability, and serviceability as compared to existing approaches.

Although THE FIGURE depicts each rank 118 including its own set of target save registers 124 integral thereto, in some embodiments, target save registers 124 may be implemented within memory controller 108, such that memory controller 108 includes a plurality of rank-level save registers for memory system 104. In addition, while the foregoing discussion, for purposes of clarity and exposition, describes target save registers 124 being implemented on ranks 118, in some embodiments, target save registers 124 may be implemented within memory controller 108 or any other suitable component of information handling system 102.

Also, for the purposes of clarity and exposition, target save registers 124 are shown as being assigned on a rank-by-rank basis. However, target save registers 124 may be used for any suitable level of granularity of memory system 104 (e.g., on a memory-module-by-memory-module basis, sub-rank-by-sub-rank basis, memory-range-by-memory-range basis, etc.).

A BIOS 105 may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an OS or other application programs) stored on compatible media (e.g., disk drives) may be executed by processor 103 and given control of information handling system 102.

Storage medium 106 may be communicatively coupled to processor 104. Storage medium 106 may include any system, device, or apparatus operable to store information processed by processor 103. Storage medium 106 may include, for example, network attached storage, one or more direct access storage devices (e.g., hard disk drives), and/or one or more sequential access storage devices (e.g., tape drives). As shown in THE FIGURE, storage medium 106 may have stored thereon an OS 114. OS 114 may be any program of executable instructions, or aggregation of programs of executable instructions, configured to manage and/or control the allocation and usage of hardware resources such as memory, CPU time, disk space, and input and output devices, and provide an interface between such hardware resources and application programs hosted by OS 114. Active portions of OS 114 may be transferred to memory 104 for execution by processor 103.

In addition to processor 103, memory system 104, BIOS 105, and storage medium 106, information handling system 102 may include one or more other information handling resources.

Using the systems and methods disclosed herein, a host system may dynamically program target save registers as usage of persistent memory space increases or decreases. Thus, if an applicant demands additional memory, additional target save registers may be modified to activate an NVDIMM to perform a save operation if the event of power loss. In addition or alternatively, a host system may take into account memory media health issues (e.g., excessive numbers of correctable errors), and discount ranks having such health issues from save operations.

Accordingly, advantages of having finer granularity for selective save operations may include: a) increased fault-tolerance on an NVDIMM by maintaining redundant copies; b) increased reliability, availability, and serviceability by preventing memory operations of unhealthy portions of memory; and c) increase battery lifetime by avoiding unnecessary writes to non-volatile memory.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
    a processor; and
    a persistent memory system communicatively coupled to the processor, the persistent memory system comprising one or more persistent memory modules and a plurality of targeted save registers, each targeted save register associated with a respective portion of the persistent memory system, and each targeted save register having a value indicative of a data criticality level for data stored in the respective portion, the data criticality level being usable to determine whether or not save operations from volatile memory to non-volatile memory of the persistent memory system are to be performed with respect to the respective portion of the persistent memory system;
    wherein each of the respective portions comprises a respective Joint Electron Device Engineering Council (JEDEC) rank of the persistent memory system.

2. The information handling system of claim 1, wherein the value of each targeted save register sets forth, with respect to the respective portion of the persistent memory system associated with the targeted save register, a second portion of the persistent memory system to which data stored in volatile memory of the respective portion of the persistent memory system is duplicated in response to a condition for performing a save operation.

3. The information handling system of claim 1, wherein the processor is configured to, alone or in combination with a memory controller of the persistent memory system, set values of the targeted save registers for usage and provisioning of the persistent memory system by the processor.

4. The information handling system of claim 3, wherein the processor is further configured to set values of the targeted save registers based on capacity of a battery for powering a save operation, and/or health of computer-readable media making up the persistent memory system.

5. A method comprising, in a persistent memory system comprising one or more persistent memory modules and a plurality of targeted save registers associated with respective portions of the persistent memory system:
    storing a respective value in each of the plurality of targeted save registers; and
    performing a save operation of the persistent memory system based on the respective values, wherein each respective value is indicative of a data criticality level for data stored in the respective portion, the data criticality level being usable to determine whether or not save operations from volatile memory to non-volatile memory of the persistent memory system are to be performed with respect to the respective portion of the persistent memory system;
    wherein each of the respective portions comprises a respective Joint Electron Device Engineering Council (JEDEC) rank of the persistent memory system.

6. The method of claim 5, wherein the value of each targeted save register sets forth, with respect to the respective portion of the persistent memory system associated with the targeted save register, a second portion of the persistent memory system to which data stored in volatile memory of the respective portion of the persistent memory system is duplicated in response to a condition for performing a save operation.

7. The method of claim 5, wherein setting the values comprises setting values of the targeted save registers for usage and provisioning of the persistent memory system by a processor communicatively coupled to the persistent memory system.

8. The method of claim 7, further comprising setting values of the targeted save registers based on capacity of a battery for powering a save operation, and/or health of computer-readable media making up the persistent memory system.

9. A persistent memory system comprising:
    one or more persistent memory modules; and
    a plurality of targeted save registers, each targeted save register associated with a respective portion of the persistent memory system, and each targeted save register having a value indicative of a data criticality level for data stored in the respective portion, the data criticality level being usable to determine whether or not save operations from volatile memory to non-volatile memory of the persistent memory system are to be performed with respect to the respective portion of the persistent memory systems;

wherein each of the respective portions comprises a respective Joint Electron Device Engineering Council (JEDEC) rank of the persistent memory system.

10. The persistent memory system of claim 9, wherein the value of each targeted save register sets forth, with respect to the respective portion of the persistent memory system associated with the targeted save register, a second portion of the persistent memory system to which data stored in volatile memory of the respective portion of the persistent memory system is duplicated in response to a condition for performing a save operation.

11. The persistent memory system of claim 9, wherein values of the targeted save registers are set by a processor communicatively coupled to the persistent memory system, alone or in combination with a memory controller of the persistent memory system, for usage and provisioning of the persistent memory system by the processor.

12. The persistent memory system of claim 11, wherein the processor is further configured to set values of the targeted save registers based on capacity of a battery for powering a save operation, and/or health of computer-readable media making up the persistent memory system.

\* \* \* \* \*